US012188681B2

(12) United States Patent
Alhorr (10) Patent No.: US 12,188,681 B2
(45) Date of Patent: Jan. 7, 2025

(54) AIR TREATMENT SYSTEM

(71) Applicant: GULF ORGANISATION FOR RESEARCH AND DEVELOPMENT, Doha (QA)

(72) Inventor: Yousef Alhorr, Doha (QA)

(73) Assignee: Gulf Organisation for Research and Development, Doha (QA)

( * ) Notice: Subject to any disclaimer, the term of this patent is extended or adjusted under 35 U.S.C. 154(b) by 0 days.

(21) Appl. No.: 18/570,829

(22) PCT Filed: Jun. 10, 2022

(86) PCT No.: PCT/GB2022/051452
§ 371 (c)(1),
(2) Date: Dec. 15, 2023

(87) PCT Pub. No.: WO2022/263794
PCT Pub. Date: Dec. 22, 2022

(65) Prior Publication Data
US 2024/0280275 A1 Aug. 22, 2024

(30) Foreign Application Priority Data
Jun. 18, 2021 (GB) ..................... 2108801

(51) Int. Cl.
*F24F 3/14* (2006.01)
*F24F 5/00* (2006.01)
*F24F 13/30* (2006.01)
(52) U.S. Cl.
CPC .......... *F24F 3/1417* (2013.01); *F24F 5/0035* (2013.01); *F24F 13/30* (2013.01); *F24F 2003/144* (2013.01); *F24F 2003/1458* (2013.01)

(58) Field of Classification Search
CPC ........ F24F 3/1417; F24F 5/0035; F24F 13/30; F24F 2003/114; F24F 2003/1458
See application file for complete search history.

(56) References Cited

U.S. PATENT DOCUMENTS 4,180,985 A * 1/1980 Northrup, Jr. .......... F24F 5/001
62/271
4,982,575 A * 1/1991 Besik ..................... F24F 3/147
165/4
(Continued)

FOREIGN PATENT DOCUMENTS

CN 1570495 A * 1/2005 ............ F24F 3/1423
WO 02086391 A1 10/2002
(Continued)

OTHER PUBLICATIONS

CN-1570495-A translation.*
(Continued)

*Primary Examiner* — Elizabeth J Martin
(74) *Attorney, Agent, or Firm* — Flener IP & Business Law; Zareefa B. Flener (57) ABSTRACT

An air treatment system is disclosed which comprises a dehumidification unit (10) comprising a liquid desiccant system comprising liquid desiccant for dehumidifying process air; an indirect evaporative cooling unit (100) for cooling process air from the dehumidification unit and for cooling the liquid desiccant; and a vapour compression unit (200) comprising a compressor (201), a condenser (202) and an evaporator (206) for further cooling process air from the indirect evaporative cooling unit. A preferred desiccant is potassium formate.

28 Claims, 3 Drawing Sheets (56) References Cited

U.S. PATENT DOCUMENTS

| | | | |
|---|---|---|---|
| 5,022,241 A | 6/1991 | Wilkinson | |
| 2004/0112077 A1* | 6/2004 | Forkosh | F24F 5/001 |
| | | | 62/271 |
| 2004/0118125 A1 | 6/2004 | Potnis | |
| 2014/0150481 A1 | 6/2014 | Vandermeulen | |
| 2014/0260369 A1* | 9/2014 | LePoudre | F28D 15/00 |
| | | | 62/314 |
| 2014/0260372 A1 | 9/2014 | Woods et al. | |
| 2017/0241654 A1* | 8/2017 | Lowenstein | F24F 3/1429 |
| 2018/0163977 A1* | 6/2018 | Vandermeulen | F24F 1/00077 |

FOREIGN PATENT DOCUMENTS

| | | | |
|---|---|---|---|
| WO | 2018191806 A1 | 10/2018 | |
| WO | 2019089980 A1 | 5/2019 | |
| WO | 2022263794 A1 | 12/2022 | |

OTHER PUBLICATIONS

Written Opinion of the International Searching Authority for Serial No. PCT/GB2022/051452; issued Jan. 2015.
Notification of Transmittal of the International Preliminary Report on Patentability for Serial No. PCT/GB2022/051452; Issued Feb. 6, 2023.
International Search Report for Serial No. PCT/GB2022/051452; Issued Oct. 4, 2022.
Patents Act 1977: Search Report Under Section 17 for GB2108801.8; Issued Aug. 2, 2021.

\* cited by examiner

AIR TREATMENT SYSTEM

The present invention relates to an air treatment system.

Air conditioning and space cooling are critical in hot and humid climates. However, air conditioners consume a large amount of electricity, and thus contribute to the generation of greenhouse gases. Desiccant cooling is an attractive energy-saving alternative to conventional air conditioning to generate a cooling effect, but has yet to become widely adopted on a commercial scale.

In liquid desiccant cooling systems, liquid desiccant circulates between a dehumidifier and a regenerator. Process air passes through concentrated and cooled liquid desiccant in the dehumidifier, for example in counterflow, to transfer moisture and heat from the air to the liquid desiccant. The diluted liquid desiccant then passes to the regenerator, in which it is heated, and a scavenger air stream is used to absorb moisture from the diluted liquid desiccant, to regenerate the liquid concentrated desiccant. The concentrated liquid desiccant may then be reused in the dehumidifier.

However, there are a number of challenges in developing large-scale liquid desiccant cooling systems.

Thus, the most commonly used liquid desiccants are solutions of lithium chloride, calcium chloride and lithium bromide (LiCl, $CaCl_2$ and LiBr respectively), which are typically regenerated at temperatures of approximately 80° C. using external sources such as waste heat or solar thermal. Such high temperatures represent a challenge to the widespread use of the technology.

Also, carryover of liquid desiccant in the process air, in particular at high speeds (for example, above 10,000 cfm (16990 $m^3/hr$) is a health concern, due to the toxicity of the desiccant, especially when droplets of desiccant float in the air to cooled enclosed spaces, or when the liquid desiccant comes into contact with persons performing system maintenance.

Liquid desiccant temperature rises above 30° C. reduce the effectiveness of moisture capture in the process air due to the rise in the partial pressure of the liquid desiccant. This in turn can require the provision of a continuous cooling source to control the temperature rise, especially when the processed air treated by the desiccant enters the system at temperatures above 30° C., as encountered in hot climates.

The economic feasibility of the use of typical inorganic liquid desiccants imposes constraints on the wide use of dehumidification systems in typical HVAC units. For example, LiCl may cost USD 1300/100L. More affordable desiccants are needed.

There are environmental challenges associated with the use of liquid desiccant solutions including LiCl, $CaCl_2$ and LiBr, which can cause significant damage to air conditioning systems due to their corrosive nature.

Solar driven dehumidification systems offer an opportunity for sustainably regenerating the dilute desiccant solution. However, solar radiation may be intermittently available, which can cause practical limitations on adoption by the HVAC industry.

Regeneration of liquid desiccant using waste heat requires the availability of a permeant external supply source. This can restrict the use of such systems to locations where suitable waste heat sources are available, making the concept less attractive and practical.

Another problem is the crystallization of liquid desiccant. Crystallization can occur in a liquid desiccant solution stored at high concentration with a decrease in temperature, generating pressure on circulating pumps. Aqueous salt desiccants may require continuous agitation to prevent crystallization, which in turn increases the energy consumption for the unit.

The present invention seeks to provide an air treatment system which is an improvement on prior art systems. Herein, "process air" is used to refer to the air being treated. The benefits of the invention discussed herein are most apparent for process air of a high humidity and temperature.

Thus, according to the present invention in a first aspect there is provided an air treatment system which comprises a dehumidification unit comprising a liquid desiccant system comprising liquid desiccant for dehumidifying process air, an indirect evaporative cooling unit for cooling process air from the dehumidification unit and for cooling the liquid desiccant, and a vapour compression unit comprising a compressor, a condenser and an evaporator for further cooling process air from the indirect evaporative cooling unit.

Thus, the system of the first aspect of the present invention may be considered to be a hybrid system in which three units, i.e. a dehumidification unit, an indirect evaporative cooling unit, and a vapour compression unit, are synergistically integrated for energy-efficiency and the treatment of 100% fresh air at large-scale, commercial capacities (e.g. 20,000 $m^3/hr$ and above). The system can be used to independently cool indoor or outdoor spaces in hot and humid climates. The system may be fully automated to manage the modes of operation of the different units based on the outside weather conditions and the supply air requirements.

Thus, the air treatment system of the first aspect of the present invention comprises a dehumidification unit which comprises a liquid desiccant system.

The liquid desiccant system comprises a liquid desiccant for absorbing moisture from process air, and preferably comprises a dehumidifier comprising a desiccator within which the process air contacts the desiccant. The liquid desiccant system preferably comprises one or more heat exchangers for controlling the temperature of the desiccant.

The liquid desiccant properties such as conductivity, dynamic viscosity, specific heat capacity and density, and operating parameters such as boiling point elevation, regeneration temperature and energy storage density determine its potential for use as a liquid desiccant. Among these properties, surface vapour pressure is one of the most important parameters that leads to heat and mass transfer in the dehumidifier. Additionally, the liquid desiccant should preferably be odourless, non-toxic, non-flammable and inexpensive.

The preferred desiccant for use in the liquid desiccant system is potassium formate (HCOOK). HCOOK is less corrosive and cheaper than conventional aqueous desiccant salts, and has a low crystallization temperature. HCOOK can effectively dehumidify air with a high moisture content. The preferred temperature for solution regeneration of weak HCOOK can be as low as 45° C.

Aqueous HCOOK solution has a low toxicity and viscosity, and is neither corrosive nor volatile. Furthermore, at high solution concentrations HCOOK can outperform conventional liquid desiccants by promoting a high degree of vapour pressure depression while maintaining a crystallisation temperature of less than 0° C.

The use of HCOOK as the liquid desiccant can result in a reduction in the atmospheric humidity ratio of more than 6 g/kg, which leads to a reduction of latent heat and a reduction in relative humidity of the process air. This in turn has the potential to reduce energy use by 20 to 30%.

The preferred liquid desiccant for use in the liquid desiccant system thus comprises an aqueous HCOOK containing solution, consists essentially of an aqueous HCOOK containing solution, or consists of HCOOK containing solution. Preferably, the only desiccant used in the liquid desiccant is HCOOK.

The liquid desiccant system preferably comprises a dehumidifier, which preferably comprises a desiccator within which the process air contacts the liquid desiccant. In the desiccator, the process air passes through the liquid desiccant, for example in crossflow, to transfer moisture and heat from the process air to the liquid desiccant. The desiccator is preferably equipped with a controller to control liquid desiccant flow rate and distribution to ensure optimum absorption efficiency of moisture and heat through the control of the liquid to process air ratio.

The desiccator preferably comprises an eliminator to help prevent liquid desiccant carryover into the process air. The eliminator may be configured, for example through its geometry, thickness, layering, spacing and/or materials used, to prevent liquid desiccant carryover at speeds of more than 10,000 cfm (approximately 17,000 m$^3$/hr). The eliminator thus preferably helps to eliminate health concerns associated with liquid desiccant carryover, with a minimum pressure drop of less than 3%.

The dehumidifier is preferably further equipped with a collection tank for collecting liquid desiccant solution from the desiccator, a pump for pumping liquid desiccant to and from the collection tank, and a showering system for spraying liquid desiccant into the process air.

In the air treatment system of the first aspect of the present invention, the liquid desiccant is cooled by the indirect evaporative cooling unit. In this connection, the liquid desiccant system preferably comprises one or more heat exchangers for controlling the temperature of the liquid desiccant. The one or more heat exchangers preferably comprise a liquid-liquid sensible heat exchanger, more preferably a series of liquid-liquid sensible heat exchangers. The one or more heat exchangers may be plate type counter flow heat exchangers for improved heat transfer efficiency. The one or more heat exchangers preferably use cold water to reduce the temperature of the liquid desiccant. In a preferred embodiment, the liquid desiccant system comprises a series of liquid-liquid sensible plate type heat exchangers through which liquid desiccant is pumped from and to the collection tank. In a preferred embodiment, water from the indirect evaporative cooling unit is used in the one or more heat exchangers to cool the temperature of the liquid desiccant. Thus, in a particularly preferred embodiment, the liquid desiccant system comprises a series of liquid-liquid sensible plate type heat exchangers in a closed loop which are in fluid communication with the indirect evaporative cooling unit, using water from the indirect evaporative cooling unit to cool the liquid desiccant.

The liquid desiccant system preferably comprises a regenerator, for concentrating liquid desiccant which has been diluted through absorption of moisture from the process air. Within the regenerator, relatively hot diluted liquid desiccant solution is exposed to a scavenger air stream, for example induced by an axial fan with an air flow proportional to the regenerated desiccant, and moisture is transferred from the diluted liquid desiccant solution to the scavenger air due to the difference in vapour pressure. The regenerator may regenerate liquid desiccant, for example HCOOK containing solution, at a rate of more than 25 g/s. The liquid desiccant system is preferably configured and controlled such that the liquid desiccant passes to the regenerator from the dehumidifier when the concentration of the liquid desiccant drops below a predetermined threshold. For example, the threshold concentration may be below 60%.

The regenerator preferably comprises a heat exchanger, for raising the temperature of the liquid desiccant, and may preferably also comprise an axial fan to induce the scavenging air. It may also preferably further comprise a liquid spraying system for spraying heated dilute liquid desiccant into the scavenging air stream, and a pump for pumping the liquid desiccant around the regenerator. The heat exchanger may be a liquid-liquid sensible plate type heat exchanger for improved heat transfer efficiency. The heat exchanger may raise the temperature of the liquid desiccant within the regenerator to above 45° C. In a preferred embodiment, the heat exchanger uses internal waste heat from the compressor of the vapour compression unit, which has the additional advantage of lowering the temperature of the compressor, thus improving its operating efficiency. In these embodiments, liquid (e.g. water) can carry the waste heat from the compressor to the heat exchanger, circulating in a closed loop independent from the refrigerant used in the vapour compression unit, to avoid any cross-contamination between the units.

The regenerator preferably comprises an eliminator, to reduce liquid desiccant loss during the regeneration process within the scavenger air stream. The eliminator may preferably comprise a cellulose pad with preferred geometry, thickness and spacing.

A preferred dehumidification process within the dehumidification unit of the system of the first aspect of the present invention may thus be summarized as follows. Liquid desiccant stored in the dehumidifier collection tank having a relatively high concentration and low temperature enters the desiccator. In the desiccator, the liquid desiccant contacts the process air, whereby heat and moisture are transferred from the process air to the liquid desiccant, by virtue of the liquid desiccant having a lower vapour pressure than the process air being dehumidified, thus drying the process air, and increasing the temperature and reducing the concentration of the liquid desiccant. The liquid desiccant then passes out of the desiccator and through the one or more heat exchangers to reduce its temperature and consequently vapour pressure, for increasing potency for absorbing moisture from process air, and then re-enters the collection tank from which a pump is used to circulate the desiccant through the spraying system with controlled liquid flow rate into the desiccator. When the liquid desiccant becomes sufficiently dilute, for example when the concentration drops below a threshold level (for example 60%), it is passed to the regenerator. Here the dilute liquid desiccant is heated, preferably by passing it through a heat exchanger, thus raising its vapour pressure. Scavenging air is then passed through the heated, dilute liquid desiccant to remove moisture (the vapour pressure of the liquid desiccant being higher than that of the scavenging air), and thus concentrate the liquid desiccant. The concentrated liquid desiccant is then passed back to the collection tank. The process for dehumidification and regeneration then continues.

The air treatment system of the first aspect of the present invention further comprises an indirect evaporative cooling unit for cooling air from the dehumidification unit and for cooling the liquid desiccant.

Evaporative cooling is a process in which air is cooled through the evaporation of water. Thus, water absorbs a large amount of heat in order to evaporate (i.e. it has a high enthalpy of vapourisation), and evaporative cooling involves a phase transition of water from liquid to gas using thermal energy in air. Indirect evaporative cooling is a process in which process air is cooled through heat exchange with a humidified scavenger air stream without any direct mixing of the process and scavenger air streams. This helps to prevent, for example, moisture and contaminant transfer between the process air stream and the scavenger air stream.

Thus, in the air treatment system of the first aspect of the present invention, dehumidified process air from the dehumidification unit passes into the indirect evaporative cooling unit, where it is cooled through heat exchange with a humidified scavenger air stream. Sensible heat from the process air is absorbed by the water in the scavenger air stream, thus cooling the process air. This in turn can result in an energy saving (for example, up to 30%) due to a reduction of the load on the evaporative coil of the vapour compression unit. The reduction of process air temperature may reach up to 15° C., depending on heat transfer efficiency between the two streams of air. The indirect evaporative cooling unit preferably comprises a crossflow plate sensible heat exchanger for exchanging heat between the process air and a humidified scavenger air stream, and may preferably also comprise a water sprayer for humidifying the scavenger air stream. The water sprayer is preferably configured to be controllable by a controller for optimum air to water heat transfer efficiency.

In a preferred embodiment, the cooled scavenger air leaving the indirect evaporative cooling unit passes through the condenser of the vapour compression unit, to assist with cooling of the refrigerant. This reduces the pressure of the refrigerant and in turn lowers the load on the compressor of the vapour compression unit, and thus its power consumption. The indirect evaporative cooling unit preferably further comprises an eliminator configured to assist with the prevention of carryover of water droplets with the scavenger air, and thus into the condenser coil in this preferred embodiment, and also to maintain water levels in the indirect evaporative cooling unit.

The indirect evaporative cooling unit is also used to cool the liquid desiccant, and in this connection water from the indirect cooling unit may pass to the dehumidifier, to cool the liquid desiccant after contact with the process air, for example within one or more heat exchangers. The indirect evaporative cooling unit preferably comprises a water collection tank for holding and collecting water for use in the water sprayer. This water may thus be used for cooling the liquid desiccant, as well as cooling the scavenger air. The water collection tank of the indirect evaporative cooling unit may also be used to supply water to cool the vapour compression unit condenser adiabatically, using direct evaporative pads as described herein, and may also be used for storing cold condensate water from the vapour compression unit evaporator coil.

The air treatment system of the first aspect of the present invention further comprises a vapour compression unit for cooling the process air from the indirect evaporative cooling unit.

Vapour compression cooling is a process in which a refrigerant is compressed in a compressor, cooled in a condenser, expanded, for example through an expansion or throttle valve, and evaporated. Thus, a refrigerant, typically a gas, is compressed in a compressor to raise its temperature and pressure. The compressed refrigerant then passes to a condenser, where heat is transferred from the refrigerant to passing air, thus lowering the temperature of the refrigerant whilst maintaining a substantially constant pressure. The cooled refrigerant is then expanded, for example through an expansion or throttle valve, which reduces both its pressure and temperature. The refrigerant then evaporates, absorbing heat from, and thus cooling, its surroundings.

The vapour compression unit used in the air treatment system of the first aspect of the present invention thus comprises a compressor, a condenser and an evaporator. As noted above, in preferred embodiments the condenser is cooled by the cooled scavenger air leaving the indirect evaporative cooling unit, to assist with cooling of the refrigerant. This in turn lowers the load on the compressor, and reduces its power consumption.

The vapour compression unit may employ direct evaporative cooling to improve efficiency. Thus, a scavenger air stream may be cooled through direct evaporative cooling, and passed through the condenser to assist with cooling. The scavenger air stream may be wetted through, for example, being passed through moisture absorbent pads which may be wetted with water, for example from one or more water sprayers. The pads may for example be cellulose pads. In preferred embodiments, the water is sourced from the indirect evaporative cooling unit, for example the water collection tank described herein. Cooling the refrigerant reduces its pressure, and thus reduces the load on the compressor, assisting with system performance and efficiency. For example, the power consumption of the compressor may be reduced, and the Coefficient of Performance increased, by more than 5% through the use of direct evaporative cooling in this way.

It is to be noted that at high relative humidity (RH), for example at or above 80%, improvements in the efficiency of the vapour compression unit through direct evaporative cooling may become marginal with regard to the performance of the condenser, and the water supply may thus be controlled to shut off at higher RH, for example when RH>80%.

The process air finally passes through the evaporator for cooling to the required temperature. In cases where process air is cooled below its dew point, the cold condensate water collected may be returned to the indirect evaporative cooling unit, to lower the temperature of the water used in the indirect evaporative cooling unit, and thus assist with lowering the temperature of the liquid desiccant through heat exchange, as described above.

As described above, in preferred embodiments waste heat from the compressor of the vapour compression unit is used to heat the diluted liquid desiccant in the regeneration process through heat exchange. This enhances the efficiency of the compressor during the regeneration process.

Process air leaving the vapour compression unit may then be blown into the space to be cooled, preferably by an Electronically Commutated (EC) fan, for enhanced control and reduced energy consumption.

According to the present invention in a second aspect there is provided the use of a potassium formate containing solution as a liquid desiccant in a system according to any preceding claim. Preferably, HCOOK is the only desiccant present in the liquid desiccant.

An illustrative embodiment of the present invention will now be described in detail with reference to the accompanying drawings, in which.

Figure 1:
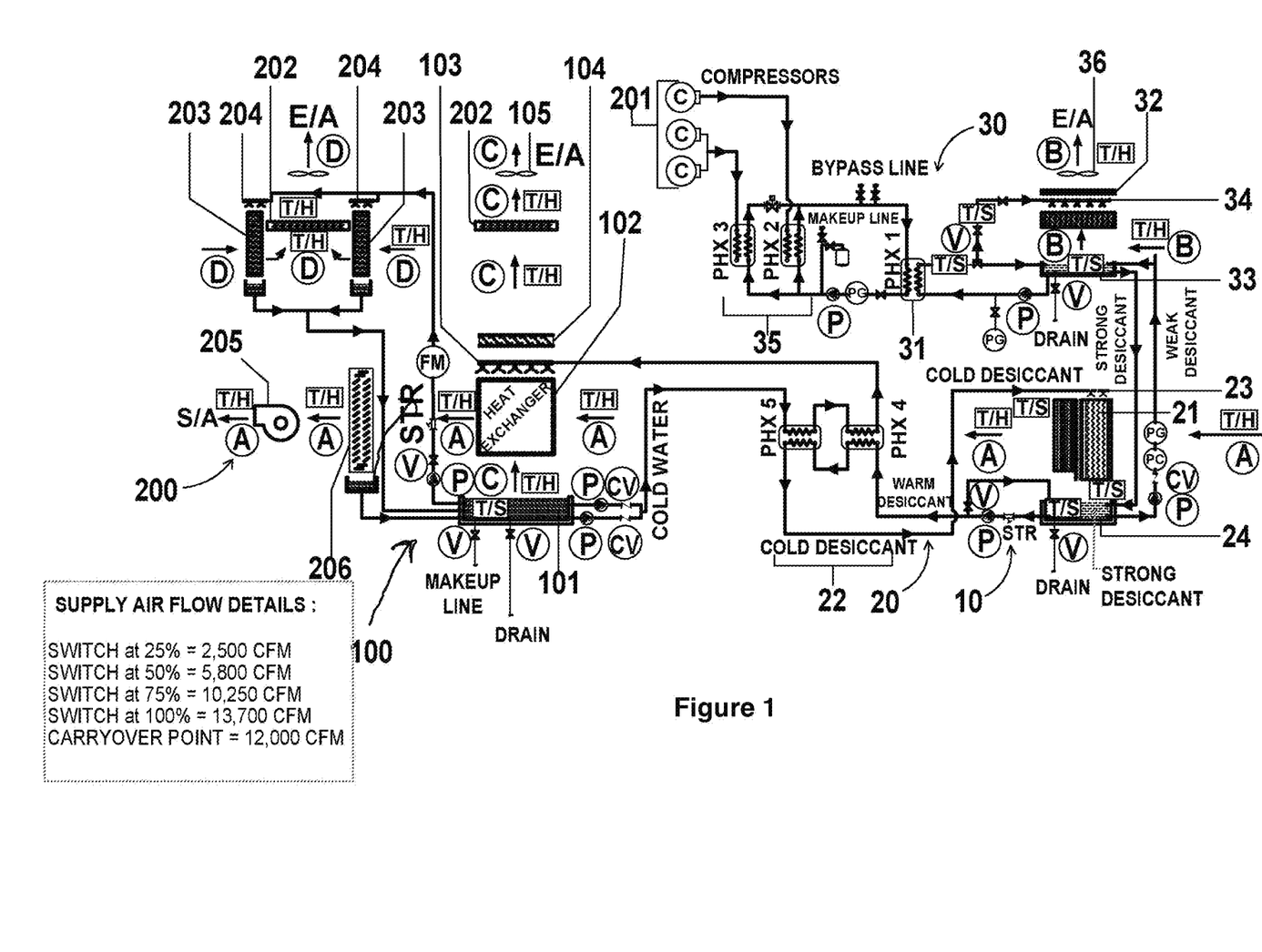
FIG. 1 is a schematic diagram of an embodiment of an air treatment system according to the first aspect of the present invention.

In the Figures, the process air is indicated by arrows with reference "A", the process air entering the system on the right hand side of FIG. 1 and exiting the system on the left hand side of FIG. 1.

Thus, FIG. 1 shows an air treatment system according to the first aspect of the present invention. The air treatment system comprises a dehumidification unit for dehumidifying process air, an indirect evaporative cooling unit for cooling process air from the dehumidification unit and for cooling the liquid desiccant, and a vapour compression unit for further cooling process air from the indirect evaporative cooling unit, generally indicated by references 10, 100 and 200 respectively.

The dehumidification unit 10 comprises a liquid desiccant system which comprises a dehumidifier (generally indicated by reference 20) and a regenerator (generally indicated by reference 30). The dehumidification unit 10 is also illustrated in FIG. 2.

Figure 2:
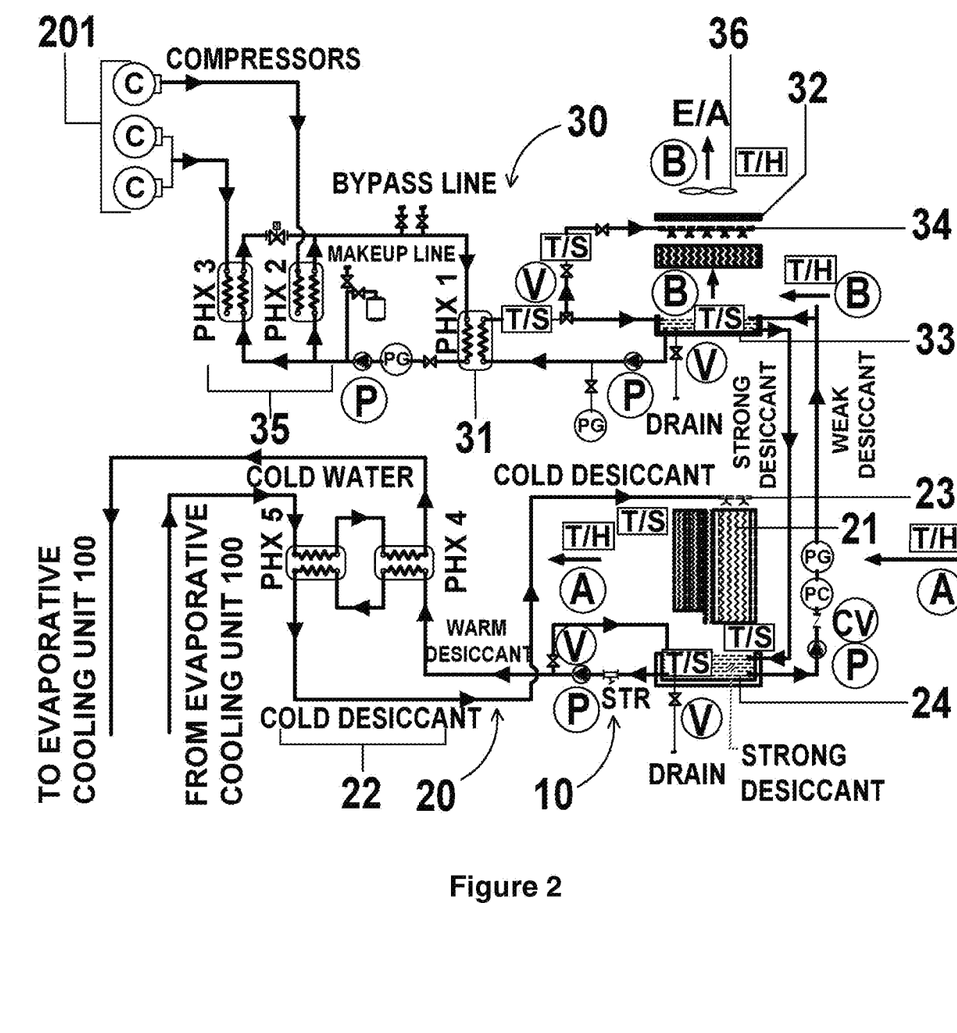
FIG. 2 is a schematic diagram showing the dehumidification unit of the embodiment shown in FIG. 1.

The dehumidifier 20 used in the illustrated embodiment comprises a desiccant (the flow path of which is shown in FIGS. 1 and 2 as indicated) for absorbing moisture from the process air A, a desiccator 21 within which the process air contacts the desiccant, a collection tank 24 and one or more heat exchangers 22 for controlling the temperature of the desiccant.

The preferred desiccant for use in the dehumidifier is aqueous potassium formate (HCOOK) containing solution. HCOOK is less corrosive and cheaper than conventional aqueous desiccator salts, and has a low crystallization temperature. HCOOK can effectively dehumidify air with a high moisture content. The preferred temperature for solution regeneration of weak HCOOK is above 45° C.

Aqueous HCOOK solution has a low toxicity and viscosity, and is neither corrosive nor volatile. Furthermore, at high solution concentrations HCOOK can outperform conventional liquid desiccants by promoting a high degree of vapour pressure depression while maintaining a crystallisation temperature of less than 0° C.

The use of HCOOK as the desiccant in the dehumidifier 20 can result in a reduction in the atmospheric humidity ratio of more than 6 g/kg, which leads to a reduction of latent heat and a reduction in relative humidity of the process air A. This in turn has the potential to reduce energy use by 20 to 30%.

The dehumidifier 20 comprises a desiccator 21 within which the process air A contacts the liquid desiccant. In the desiccator 21, the process air A passes through the liquid desiccant in crossflow, to transfer moisture and heat from the process air A to the liquid desiccant. In the illustrated embodiment, the liquid desiccant is held in the collection tank 24, and the process air A passes through a spray of liquid desiccant provided by sprayers 23. The desiccator 21 is equipped with a controller (not shown) to control liquid desiccant flow rate and distribution to ensure optimum absorption efficiency of moisture and heat through the control of the liquid to process air A ratio.

The desiccator 21 preferably comprises an eliminator (not shown in the Figures) to help prevent liquid desiccant carryover into the process air. The eliminator may be configured, for example through its geometry, thickness, spacing, layering and/or materials used, to prevent liquid desiccant carryover at speeds of more than 10,000 cfm (approximately 17,000 m³/hr). The eliminator thus preferably helps to eliminate health concerns associated with liquid desiccant carryover, with a minimum pressure drop of less than 3%.

The dehumidifier 20 comprises a plurality of heat exchangers 22 for controlling the temperature of the liquid desiccant. In the illustrated embodiment, the heat exchangers 22 are plate type counter flow liquid-liquid sensible heat exchangers, and use cold water from the indirect evaporative cooling unit 100 to cool the liquid desiccant.

The liquid desiccant system comprises a regenerator 30, for concentrating liquid desiccant which has been diluted through absorption of moisture from the process air A in the desiccator 21. Within the regenerator 30, relatively hot diluted liquid desiccant solution is exposed to a scavenger air stream (indicated by arrows "B") provided via an axial fan 36, and moisture is transferred from the diluted liquid desiccant solution to the scavenger air B due to the difference in vapour pressure. The regenerator 30 may regenerate the liquid desiccant at a rate of more than 25 g/s. The liquid desiccant system is configured and controlled such that the liquid desiccant passes to the regenerator 30 from the dehumidifier 21 when the concentration of the liquid desiccant drops below a predetermined threshold. For example, the threshold concentration may be below 60%.

The regenerator 30 in the illustrated embodiment comprises a liquid desiccant reservoir 33 for receiving dilute liquid desiccant from the dehumidifier 20. The regenerator 30 also comprises a liquid-liquid sensible plate type counter flow heat exchanger 31, to raise the temperature of the liquid desiccant. The heat exchanger 31 may raise the temperature of the liquid desiccant within the regenerator 30 to, for example, above 45° C. In the illustrated embodiment, the heat exchanger 31 uses waste heat from the compressors 201 of the vapour compression unit 200, which has the additional advantage of lowering the temperature of the compressors 201, thus improving their operating efficiency. In the illustrated embodiment, waste heat from the compressors 201 is used to heat water through heat exchangers 35, which in turn heat the liquid desiccant in heat exchanger 31, as shown in FIGS. 1 and 2.

In the illustrated embodiment, the regenerator 30 comprises a sprayer 34 for spraying the hot liquid desiccant into the scavenger air B, and an eliminator 32 to reduce liquid desiccant loss during the regeneration process within the scavenger air stream B. The eliminator 32 may comprise a cellulose pad.

The dehumidification process within the dehumidification unit 10 of the system of the first aspect of the present invention as illustrated by FIGS. 1 and 2 may be described as follows. Liquid desiccant having a relatively high concentration ("strong") and low temperature enters the desiccator 21 from collection tank 24 via sprayers 23. In the desiccator 21, the liquid desiccant is sprayed into the process air A, whereby heat and moisture are transferred from the process air A to the liquid desiccant, by virtue of the liquid desiccant having a lower vapour pressure than the process air A being dehumidified, thus cooling and drying the process air A, and increasing the temperature and reducing the concentration of the liquid desiccant. Warm liquid desiccant passes out of the desiccator 21 into the collection tank 24, and through the heat exchangers 22 to reduce its temperature (and consequently vapour pressure, for increasing potency for absorbing moisture from process air), and then returns to the desiccator 21. When the liquid desiccant becomes sufficiently dilute ("weak"), for example when the concentration drops below a threshold level (for example below 60%), it is passed to the regenerator reservoir 33. From here the weak liquid desiccant passes through heat exchanger 31, thus raising its vapour pressure. The heated dilute liquid desiccant passes from the heat exchanger 31 to sprayer 34 where it is sprayed into scavenger air B to remove moisture (the vapour pressure of the liquid desiccant being higher than that of the scavenging air), and thus concentrate the liquid desiccant. The concentrated ("strong") liquid desiccant is then passed back to the collection tank 24. The liquid desiccant flowpaths are shown in FIGS. 1 and 2.

Figure 3:
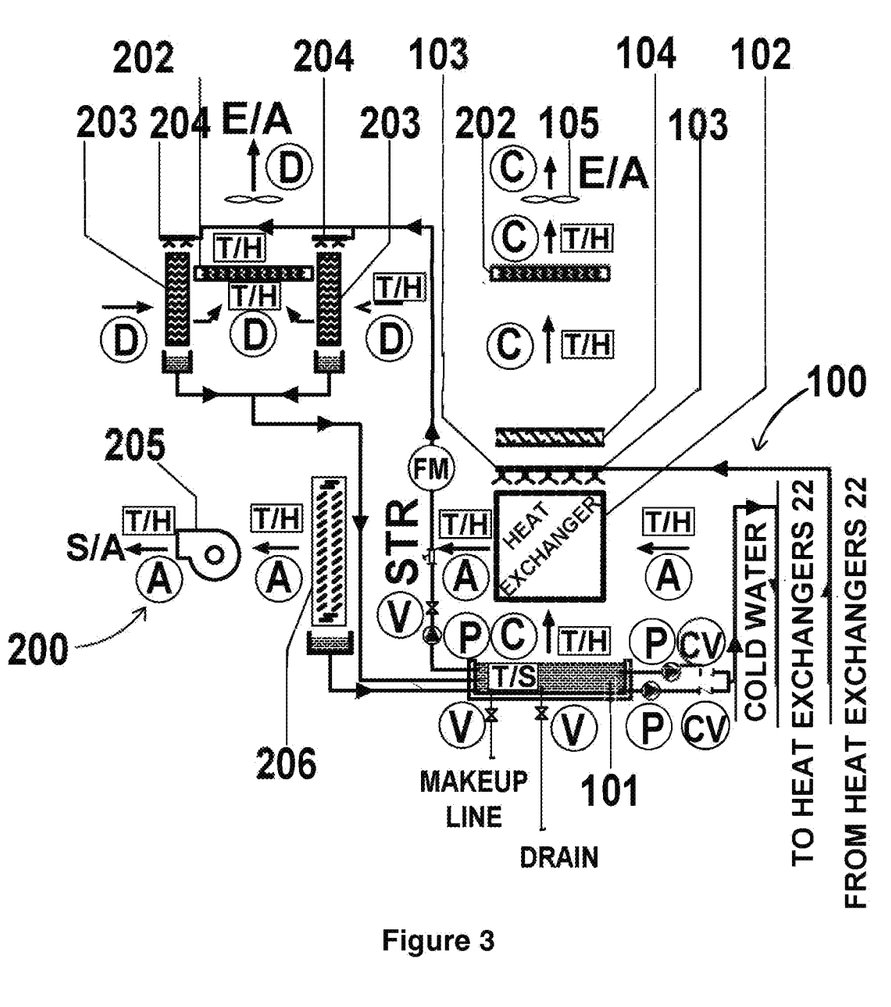
FIG. 3 is a schematic diagram showing the indirect evaporative cooling unit and vapour compression unit of the embodiment shown in FIG. 1.

The illustrated embodiment of the air treatment system of the first aspect of the present invention further comprises an indirect evaporative cooling unit 100 for cooling air from the dehumidification unit 10 and for cooling the liquid desiccant, as illustrated in FIGS. 1 and 3.

Thus, in the illustrated embodiment, dehumidified process air A from the dehumidification unit 10 passes into the indirect evaporative cooling unit 100, where it is cooled through heat exchange with a humidified scavenger air stream (indicated by arrows "C"). Sensible heat from the process air A is absorbed by the water in the scavenger air stream C, thus cooling the process air A. This in turn can result in an energy saving (for example, up to 30%) due to a reduction of the load on the evaporative coil of the vapour compression unit. The reduction of process air temperature may reach up to 15° C., depending on heat transfer efficiency between the two streams of air. The illustrated indirect evaporative cooling unit 100 comprises a crossflow sensible plate heat exchanger 102 for exchanging heat between the process air A and the humidified scavenger air stream C, and a water sprayer 103 for humidifying the scavenger air stream with water from water collection tank 101. The water sprayer 103 is preferably configured with adequate nozzles distributed evenly to cover the scavenger air stream C and to be controllable by a controller (not shown) for optimum air to water heat transfer efficiency.

The cooled scavenger air C leaving the indirect evaporative cooling unit 100 passes through the condenser 202 of the vapour compression unit 200, to assist with cooling of the vapour compression unit refrigerant. This reduces the pressure of the refrigerant and in turn lowers the load on the compressors 201 of the vapour compression unit 200, and thus its power consumption. In the illustrated embodiment, the indirect evaporative cooling unit 100 further comprises an eliminator 104 configured to assist with the prevention of carryover of water droplets with the scavenger air, and thus into the coil of the condenser 202, and also to maintain water levels in the indirect evaporative cooling unit 100. After passing through the condenser 202, the scavenger air C is expelled by fan 105.

Water from the indirect evaporative cooling unit 100 passes to the dehumidifier 20 as indicated in the Figures, to cool the liquid desiccant after contact with the process air A within the heat exchangers 22.

The illustrated embodiment of the air treatment system of the first aspect of the present invention further comprises a vapour compression unit 200 for cooling the process air A from the indirect evaporative cooling unit 100, as illustrated in FIGS. 1 and 3.

The vapour compression unit 200 comprises compressors 201, a condenser 202 and an evaporator 206. As noted above, in the illustrated embodiment the condenser 202 is cooled by the cooled scavenger air C leaving the indirect evaporative cooling unit 100, to assist with cooling of the refrigerant. This in turn lowers the load on the compressors 201, and reduces power consumption.

In the illustrated embodiment, the vapour compression unit 200 employs direct evaporative cooling to improve efficiency. Thus, a scavenger air stream (indicated by arrows "D") may be cooled through direct evaporative cooling, and passed through the condenser 202 to assist with cooling. The scavenger air stream D may be wetted through, for example, being passed through moisture absorbent pads 203, which are wetted with water from water sprayers 204. The pads may for example be cellulose pads. In the illustrated embodiment, water is sourced from the indirect evaporative cooling unit water collection tank 101 as indicated in the Figures. Cooling the refrigerant reduces its pressure, and thus reduces the load on the compressors 201, assisting with system performance and efficiency. For example, the power consumption of the compressors 201 may be reduced, and the Coefficient of Performance increased, by more than 5%, through the use of direct evaporative cooling in this way. It is to be noted that at high relative humidity (RH), for example at or above 80%, improvements in the efficiency of the vapour compression unit 200 through direct evaporative cooling may become marginal with regard to the performance of the condenser, and the water supply may thus be controlled to shut off at higher RH, for example when RH>80%.

Process air A passing through the coil of the evaporator 206 to reduce its temperature may be cooled under its dew point and water collected at this stage may be returned to the indirect evaporative cooling unit water collection tank 101, to lower the temperature of the water used in the indirect evaporative cooling unit 100, and thus assist with lowering the temperature of the liquid desiccant through heat exchange, as described above.

As described above and illustrated in FIGS. 1 and 2, in preferred embodiments waste heat from the compressors 201 of the vapour compression unit 200 is used to heat the diluted liquid desiccant in the regeneration process through heat exchange. This enhances the efficiency of the compressors 201.

Process air A leaving the vapour compression unit 200 is then blown into the space to be cooled by an EC fan 205.

It will be appreciated that the embodiment illustrated above describes the invention for the purposes of illustration only. In practice the invention may be applied to many different configurations, the detailed embodiments being straightforward for those skilled in the art to implement.

What is claimed is:

1. An air treatment system which comprises a dehumidification unit comprising a liquid desiccant system comprising liquid desiccant for dehumidifying process air, an indirect evaporative cooling unit for cooling process air from the dehumidification unit, and for cooling the liquid desiccant, and a vapour compression unit comprising a refrigerant, a compressor, a condenser and an evaporator, for further cooling process air from the indirect evaporative cooling unit;
   wherein the indirect evaporative cooling unit is configured to cool the refrigerant in the condenser to reduce the load on the compressor;
   and wherein the air treatment system further comprises a heat exchanger for extracting heat from the vapour compression unit to provide heat for regeneration of the liquid desiccant.

2. The air treatment system according to claim 1 configured for the treatment of fresh air at a capacity of 20,000 m³/hr and above.

3. The air treatment system according to claim 1 wherein the liquid desiccant comprises a potassium formate containing solution.

4. The air treatment system according to claim 3 which is configured to provide a reduction in atmospheric humidity ratio of more than 6 g/kg.

5. The air treatment system according to claim 1 wherein the liquid desiccant system comprises one or more heat exchangers for controlling the temperature of the liquid desiccant.

6. The air treatment system according to claim 5 wherein the liquid desiccant system comprises a series of liquid-liquid sensible plate-type counter flow heat exchangers.

7. The air treatment system according to claim 5 wherein the one or more heat exchangers are in fluid communication with the indirect evaporative cooling unit, for using water from the indirect evaporative cooling unit to cool the liquid desiccant.

8. The air treatment system according to claim 1 wherein the liquid desiccant system comprises a desiccator having an eliminator to reduce liquid desiccant carryover into the process air.

9. The air treatment system according to claim 8 wherein the eliminator is configured to reduce liquid desiccant carryover at speeds above 8,000 cfm with a minimum pressure drop of less than 3%.

10. The air treatment system according to claim 1 wherein the liquid desiccant system comprises a regenerator for concentrating liquid desiccant which has been diluted through absorption of moisture from the process air.

11. The air treatment system according to claim 10 wherein the regenerator is configured to regenerate liquid desiccant at a rate of more than 25 g/s.

12. The air treatment system according to claim 10 wherein the liquid desiccant system is configured to pass liquid desiccant to the regenerator when the concentration of the liquid desiccant drops below a predetermined threshold.

13. The air treatment system according to claim 12 wherein the threshold is less than 60%.

14. The air treatment system according to claim 10 wherein the regenerator comprises a heat exchanger for raising the temperature of the liquid desiccant.

15. The air treatment system according to claim 14 wherein the heat exchanger is a liquid-liquid sensible heat exchanger.

16. The air treatment system according to claim 14 wherein the heat exchanger uses internal waste heat from the compressor of the vapour compression unit to heat the liquid desiccant.

17. The air treatment system according to claim 10 wherein the regenerator comprises an eliminator for reducing liquid desiccant loss during the regeneration process within the scavenger air stream.

18. The air treatment system according to claim 17 wherein the eliminator comprises one or more cellulose pads.

19. The air treatment system according to claim 1 wherein the indirect evaporative cooling unit comprises a crossflow plate heat exchanger for exchanging sensible heat between process air and a humidified scavenger air stream.

20. The air treatment system according to claim 19 configured such that cooled scavenger air leaving the indirect evaporative cooling unit passes through the condenser of the vapour compression unit.

21. The air treatment system according to claim 1 wherein the indirect evaporative cooling unit comprises an eliminator configured to assist with the prevention of carryover of water droplets with scavenger air.

22. The air treatment system according to claim 1 wherein the vapour compression unit is configured to employ direct evaporative cooling.

23. The air treatment system according to claim 22 configured to cool a scavenger air stream through direct evaporative cooling, and pass the cooled scavenger air stream through the condenser to assist with cooling.

24. The air treatment system according to claim 23 wherein the scavenger air stream is wetted via moisture absorbent pads to assist cooling the condenser adiabatically.

25. The air treatment system according to claim 24 wherein the pads comprise cellulose pads.

26. The air treatment system according to claim 24 configured to source water for wetting the pads from the indirect evaporative cooling unit.

27. The air treatment system according to claim 1 configured to return water captured from a coil of the evaporator of the vapour compression unit to a water tank of the indirect evaporative cooling unit to reduce the temperature of the water in the tank for use in cooling the liquid desiccant and scavenging air used in the indirect evaporative cooling unit, wherein the scavenging air is humidified with water from the tank.

28. The air treatment system according to claim 1 comprising an Electronically Commutated (EC) fan, for blowing cooled and dehumidified process air into a desired space.

\* \* \* \* \*